United States Patent [19]

Anzinger et al.

[11] Patent Number: 4,668,733
[45] Date of Patent: May 26, 1987

[54] POUR POINT DEPRESSANTS COMPRISING POLYOLEFINS MODIFIED WITH SIDE CHAINS

[75] Inventors: Hermann Anzinger; Herbert Fischer, both of Duesseldorf; Claus-Peter Herold, Mettmann; Wolfgang Zoellner, Duesseldorf, all of Fed. Rep. of Germany

[73] Assignee: Henkel Kommanditgesellschaft auf Aktien, Duesseldorf, Fed. Rep. of Germany

[21] Appl. No.: 844,912

[22] Filed: Mar. 27, 1986

[30] Foreign Application Priority Data

Mar. 29, 1985 [DE] Fed. Rep. of Germany ....... 3511513

[51] Int. Cl.$^4$ ................................................. C08F 8/14
[52] U.S. Cl. ........................................ 524/572; 252/9; 525/329.3; 525/332.9; 525/333.2
[58] Field of Search .................... 524/572; 525/329.3, 525/332.9, 333.2

[56] References Cited

U.S. PATENT DOCUMENTS

| 2,692,892 | 10/1954 | Hillyer et al. | 525/333.2 |
| 3,397,164 | 8/1968 | Frew, Jr. | 525/333.2 |
| 3,904,385 | 9/1975 | Sweeney | 44/62 |
| 3,951,929 | 4/1976 | Sweeney | 44/62 |
| 4,083,834 | 4/1978 | Komatsu et al. | 525/333.2 |
| 4,528,340 | 7/1985 | Hayashi et al. | 525/333.2 |

FOREIGN PATENT DOCUMENTS

| 51-38756 | 10/1976 | Japan . |
| 799719 | 8/1958 | United Kingdom . |
| 2125805 | 3/1984 | United Kingdom . |

Primary Examiner—Joseph L. Schofer
Assistant Examiner—Bernard Lipman
Attorney, Agent, or Firm—Ernest G. Szoke; Henry E. Millson, Jr.; Mark A. Greenfield

[57] ABSTRACT

A pour point depressant composition and a method for its use. The pour point depressant is a predominantly butadiene polymer epoxidized and then ring-opened with a $C_{12-24}$ carboxylic acid, or ring-opened with an alcohol followed by esterification.

27 Claims, No Drawings

POUR POINT DEPRESSANTS COMPRISING POLYOLEFINS MODIFIED WITH SIDE CHAINS

BACKGROUND OF THE INVENTION

1. Field of the Invention

The invention relates to pour point depressants and their use as flow parameters for oils, particularly paraffin-containing crude oils. The composition comprises polyolefins which have been modified by at least one side chain to the olefin monomer backbone.

2. Statement of the Related Art

As a result of the recent shortage of crude oil, there was a steady increase in the production and processing of petroleum crude oils having a relatively high content of paraffin hydrocarbons which are solid at room temperature. Oils such as these lose their fluidity on cooling from the higher temperature of the reservoir to ambient temperature through the crystallization of relatively high-melting constituents. In order, therefore, to avoid difficulties during production, transport and processing, "fluidity promoters," also known as "crystallization inhibitors," "flow promoters," and "pour point depressants" (see below), are added to the crude oil in the warm state in which it accumulates at the well, i.e., in a state in which the paraffin is still dissolved in the crude oil. The flow promoters used are generally polymers. They prevent the formation of relatively large aggregations of paraffin crystals and, in doing so, improve the fluidity of the crude oil. This is accompanied by a reduction in the pour point. The pour point is the temperature at which the crude oil is fluid as defined by a standard method. Accordingly, flow promoters are also generally known as pour point depressants and are characterized by the reduction which they bring about in the pour point.

Several such products are already known. U.S. Pat. Nos. 3,904,385 and 3,951,929 and corresponding published German patent application No. 22 64 328 describe the use of poly(n-alkyl)acrylate containing from 18 to 24 carbon atoms in the alcohol function. One of the disadvantages of these products is that they have to be used in relatively high concentrations of from 0.01 to 3% by weight, based on the weight of crude oil. Another disadvantage is that the stock solutions of the flow promoters themselves, usually 30 to 50% solutions in toluene, are impossible or very difficult to handle at ambient temperatures around freezing point or lower.

The same disadvantage also applies to the products described in British Pat. No. 2,125,805 and corresponding published German patent application No. 32 26 252, i.e., esters of (meth)acrylic acid with long-chain alcohols which have been chain-extended by reaction with ethylene oxide and/or propylene oxide. Although these products lower the pour point even when used in very small quantities, their solutions are virtually impossible to process at temperatures below about 0° C.

Some rection products of epoxide polybutadienes are already known and used in unrelated industries. Thus, published German patent application No. 34 42 200 and corresponding U.S. patent application No. 799,536 filed Nov. 19, 1985, (which is incorporated herein by reference and the patent rights to which were commonly assigned with the subject invention effective their respective conception dates), describe air-drying lacquer binders in the form of reaction products of epoxidized polybutadienes with: unsaturated $C_{6-22}$ carboxylic acids; or with alcohols having a functionality of from 2 to 6 which are then reacted in a following step up to an OH number below 25 by esterification with unsaturated $C_{6-22}$ carboxylic acids. The compounds disclosed in the foregoing have only unsaturated side chains, which is to be expected since their disclosed utility is for air drying laquer binders. Unsaturated side chains would also be substantially less desirable for pour point depressants, a utility disclosed below for the present invention.

It is standard practice with pour point depressants based on (meth)acrylates to produce the monomers by azeotropic esterification in toluene or xylene and also to polymerize them in those solvents, in contrast with those of the present invention which can be produced without using solvents, as well be discussed below.

SUMMARY OF THE INVENTION

This invention relates to pour point depressants compositions and methods for their use in lowering the pour points of oils. It is particularly useful for lowering the pour point of crude oil, especially when it contains paraffin hydrocarbons which are solid at atmospheric temperatures. The useful compounds are disclosed generally in U.S. application Ser. No. 799,536 (discussed above and incorporated herein by reference), although only some of the compounds disclosed in that application are useful as pour point depressants.

More specifically, the pour point depressant compounds of this invention are polyolefins having primarily unbranched alkyl side chains which are substantially saturated. Advantages of the inventive pour points depressants and method is that the compounds may be produced without using solvents, and may be processed into stock solutions which can be handled at temperatures as low as 0° C.

Apart from their favorable drying properties, these products have the advantage of a low viscosity by comparison with polymers having the same molecular weight, but a different structure. By virtue of their low viscosity, products of the type in question have the advantage that they can be produced without using solvents and, accordingly, may be dissolved in a solvent of choice before use.

As will be apparent from the following description of the inventive compounds, they are extremely difficult to define in terms of a single molecular formula. For this reason, they will be described in terms of reaction products. However, this invention should be considered as including such compounds and their use as pour point depressants, regardless of the method by which they are synthesized.

Thus, the compound of this invention may be described as a polyolefin, whose backbone monomer is predominantly a butadiene, which has been epoxidized at either or both ethylenic bonds, and which is then linked through opening of the epoxy ring with either: (a) at least one first sturated $C_{12-24}$-carboxylic acid residue, 0 to 30 mol % of which may be replaced by at least one short chain $C_{4-10}$-monocarboxylic acid residue; or (b) at least one alcohol which may be (i) a primary, saturated, $C_{12-24}$-alcohol, (ii) a $C_{2-12}$-polyol having from 2 to 6 hydroxyl moieties and up to 3 ether-oxygen atoms, or (iii) any mixture of the foregoing, in a first reaction step. Hydroxyl moieties resulting from the ring opening are further linked to at least one second saturated $C_{12-24}$-carboxylic acid residue, which may be the same or different than the first, in a second reaction step, so that the invention pour point depressant composition has a hydroxyl number at least below 25 mg KOH/g. This is accomplished by an esterification reaction.

The pour point depressant composition of this invention may be used to lower the pour point of particularly viscous animal, vegetable, or petroleum oils, particularly petroleum crude oils with a high paraffin or other wax content. The pour point depressants are used by adding them alone or as solutions in solvents to the oils, in at least an amount effective to lower the pour point of the oil to a desired given temperature.

This invention also encompasses any oil to which a pour point depressant effective amount of an inventive compound has already been added.

DETAILED DESCRIPTION OF THE INVENTION

Other than in the operating examples, or where otherwise indicated, all numbers expressing quantities of ingredients, reaction conditions, or defining ingredient parameters used herein are to be understood as modified in all instances by the term "about."

In the context of this invention, polybutadienes are understood above all to be the various structurally isomeric homopolymers of 1,3-butadiene. However, they are also understood to include copolymers to the type in which butadiene determines the chemical character of the compound. Butadiene homopolymers may exist as two isomers, namely as 1,4-polybutadiene and as 1,2-polybutadiene. 1,4-polybutadienes are linear, unbranched, and contain in the main chain double bonds in the "cis" or "trans" configuration, the 1,2-polybutadienes contain side groups having one vinylic double bond.

The epoxidation products of all the isomers mentioned above are suitable starting materials for the pour point depressants according to the invention.

In one embodiment of the invention, it is possible to use partially epoxidized cis-1,4-polybutadienes. Thus, 1,4-polybutadienes containing more than 70% of their double bonds in the cis configuration are suitable. Commercially available products of this type containing 80% or even 98% of their double bonds in the cis configuration are particularly suitable.

In another embodiment of the invention, it is possible to use 1,4-polybutadienes containing more than 20%, preferably more than 50%, most preferably 60 to 98% of their double bonds in the trans configuration.

Another embodiment of the invention is characterized by the use of 1,2-polybutadienes, i.e. materials containing vinylic double bonds. One particularly suitable starting material of this type contains from 20 to more than 80%, preferably 20 to more than 90%, most preferably from 20 to 98% lateral ethylenic bonds.

In the majority of cases, one may use an isomeric mixture of polybutadienes i.e. 1,4-polybutadienes containing from 20 to 70% of their duble bonds in the cis configuration and/or from 20 to 50% of their double bonds in the trans configuration which, in addition, may contain from 0 to 3%, from 3 to 30% or even more side groups containing vinylic double bonds. Polybutadienes of different configuration may be produced by any of the methods generally known in polymer chemistry, see for example the book by H. G. Elias entitled "Makromolekuele," 4th Edition, Huethig und Wepf-Verlag (pub.), Basel/Heidelberg/New York, pages 676 (change in configuration from "cis" to "trans") and pages 744–746 and 1012, et seq.

The polyolefins according to the invention may be produced not only from epoxidized homopolymers of 1,3-butadiene, but also from epoxidized copolymers. Suitable copolymers are those of butadiene with styrene and/or acrylonitrile. Regardless the copolymer used, the butadiene content should predominate, i.e. not be less than 50% by weight.

The epoxidation process used to produce the epoxidized polybutadienes on which the polyolefins are based is not critical. Any standard epoxidation process may be used, including epoxidation with peracids, such as peracetic acid.

The pour point depressants according to the invention may be based on epoxidized polybutadienes containing from 1 to 8% by weight of epoxide oxygen, preferably 2 to 6% by weight, most preferably 3 to 5% by weight.

Accordingly, for every 10 double bonds originally present, up to 50% or even less may be subjected to epoxidation. The percentages quoted are based on polybutadienes. Where the above copolymers of butadiene are used, necessarily resulting in fewer double bonds in the polymer chain, a correspondingly higher conversion percentage, based on double bonds, is necessary in order to keep the total epoxide oxygen content between 1 and 8%. So far as the properties of the pour point depressants according to the invention are concerned, molecular weight is of minor importance, affecting at most the viscosity of the stock solutions. Accordingly, it may be preferred for reasons of pourability and processability, particularly at low temperatures, to use products of relatively low molecular weight. As a result, modified polyolefins according to the invention are preferably derived from epoxidized polybutadiene having a number average molecular weight of 500 to 10,000, preferably 500 to 5,000, most preferably 1,000 to 2,000.

The pour point depressants according to the invention may be polyolefins having unbranched and saturated alkyl side chains containing side chains derived from saturated $C_{12-24}$ carboxylic acids. The carboxylic acid residues derive from individual saturated carboxylic acids or from mixtures of saturated carboxylic acids. Particularly suitable carboxylic acid mixtures are fatty acids. Fatty acids are understood to be mixtures of monobasic carboxylic acids containing an even number of carbon atoms which are derived from natural oils and fats. Fatty acids containing from 16 to 22 carbon atoms, i.e. palmitic acid, stearic acid, arachic acid or behenic acid, are preferred. Unsaturated fatty acids, more especially olefinically mono- or poly-unsaturated fatty acids, may also be used, but only in small amounts in the mixtures. In this context, "small amounts" means that the fatty acid mixtures should have an iodine number below 50 and more especially below 10. Accordingly, fatty acid mixtures which have been subjected to catalytic hydrogenation or partial hydrogenation are preferred. Thus, it is possible to use hardened tallow fatty acid, hardened rapeseed oil fatty acid or hardened soybean oil fatty acid, although other hardened fatty acids of vegetable, land-animal or marine-animal fats are also generally suitable, providing they are at least predominantly $C_{12-24}$-carboxylic acids.

The $C_{12-24}$-carboxylic acids mentioned above may be introduced into the epoxidized polyolefin backbone during the ring-opening reaction in the first step of the synthesis. In addition, they may be introduced in a second reaction step by reaction with the secondary hydroxyl groups (esterification). However, up to 30 mol % of short-chain ($C_{4-10}$) monocarboxylic acids may also be used to replace the $C_{12-24}$ carboxylic acids according to the invention. Linear, branched, and aromatic monocarboxylic acids such as isobutyric acid, cyclohexane carboxylic acid, benzoic acid, or short-chain fatty acid cuts containing up to 10 carbon atoms, may all be used as the short-chain fatty acid replacements.

The modified polyolefins according to the invention contain monocarboxylic acids attached to the polybutadiene structure either directly through ester moieties or indirectly through an intermediate moiety derived from a polyfunctional alcohol. Suitable polyfunctional alcohols are $C_{2-12}$ aliphatic alcohols having a functionality of from 2 to 6 which may contain up to 3 ether-oxygen atoms. Suitable difunctional alcohols include diols normally used in the lacquer industry, such as ethylene glycol, propylene glycol, neopentyl glycol, or dimers and trimers thereof containing 2 and 3 ether oxygen bridges in the molecule. Suitable triols are glycerol, trimethylol ethane, or trimethylol propane. Suitable alcohols having a functionality of 4 include pentaerythritol or dimers of the abovementioned triols. Sorbitan is one example of an aliphatic alcohol containing 6 hydroxyl groups, although trimers of the above-mentioned triols containing 2 ether oxygen bridges in the molecular are also suitable. Mixtures of any of these alcohols are also suitable.

Of the di- to tetra-functional alcohols used for ring opening, aliphatic alcohols are preferred. Whatever the alcohol used, it must show adequate solubility in polybutadienes. This is the case, for example, with the preferred polyfunctional alcohols, which are trimethylol propane, ditrimethylol propane, glycerol, or their mixture.

In another embodiment of the invention, it is also possible to use reaction products of epoxidized polybutadienes in which the epoxide group has been opened with primary linear $C_{12-24}$ alcohols. Of the primary, linear monofunctional alcohols available, fatty alcohols are particularly suitable, the fatty alcohols corresponding to the above-mentioned fatty acids being preferred. Thus, the ring-opening reaction may be carried out with lauryl, myristyl, palmityl, stearyl, arachidyl or behenyl alcohol or mixtures thereof, which may be produced from fatty acids by hydrogenation of the carbonyl function and possible double bonds. Among the above-mentioned fatty alcohols, $C_{18}$ and $C_{22}$ fatty alcohols are particularly favorable and preferred modifying agents. The same preferences also apply to the corresponding fatty acids.

The polyolefins having unbranched alkyl side chains comprising the pour point depressants of this invention are produced from epoxidized polybutadienes by reaction in a one step synthesis with the (preferably) mixtures of saturated carboxylic acids, or in the first step of a two-step synthesis with the long-chain, primary, unbranched $C_{12-24}$ alcohols.

If it is intended to produce pour point depressants which contain an intermediate member based either on one of the abovementioned polyfunctional aliphatic alcohols or on the abovementioned primary, monofunctional long-chain alcohols, located between the polybutadiene backbone and the saturated carboxylic acid residues, the epoxidized polybutadienes are initially reacted with the corresponding alcohols. The alcohol-modified polybutadienes are then esterified with the saturated carboxylic acid mixtures. The reaction of polybutadienes with saturated carboxylic acids takes place at temperatures of 200° to 250° C., preferably 230° C. The reaction is best carried out in an inert gas (nitrogen) atmosphere.

Standard catalysts suitable for the reaction of epoxides may be used for the reaction. Suitable catalysts are, for example, organometallic compounds of the elements tin or titanium. Organotin compounds, for example acidic organotin compounds, are particularly suitable and are commercially available under the trademark "Swedcat 3" from Swedstab AB Sweden.

The reaction may be carried out in the presence or absence of solvents. Suitable solvents are high-boiling hydrocarbons, preferably with a boiling point over 100° C., such as xylene, toluene, diethylene glycol methyl ether, or the like.

Up to 2 mols of fatty acids may be used per mol of epoxide moieties. It has proven to be favorable to use more than 1 mol, but less than 2 mols, and especially 1.7 to 1.9 mols of fatty acid per mol of epoxide moities, allowance having to be made here for the alcohols used for the ring-opening reaction. The reaction normally takes between 2 and 12 hours, depending on the temperature and the catalyst used. It has been found that, with a molar deficit of from 15 to 20%, based on the equivalence of 2 mols of fatty acid per mol of epoxide moities, the products obtained have both a (desirably) low hydroxyl number and a (desirably) low acid number, whereas with direct equivalence more or less large quantities of carboxylic acid groups are left over and give rise to an (undesirable) high acid number.

To produce modified polyolefins according to the invention which contain either long-chain primary alcohol residues or polyfunctional alcohols as a bridge between the polybutadiene component and the saturated carboxylic acid mixtures, the epoxidized polybutadienes are first reacted with the alcohol component.

The reaction may be catalyzed by bases, such as alkali or alkaline earth hydroxides or tertiary amines. The reaction temperatures are in the range 150° to 200° C., preferably 160° to 180° C., the reaction times amounting to a few hours. In order to obtain particularly favorable products, it is advisable in this reaction initially to introduce the catalyst and the polyfunctional alcohol into the reaction vessel, and then to introduce the epoxidized polybutadiene as such or in solution, either continuously or in portions during the reaction. The basic catalyst may be removed by neutralization with acids, for example HCl, and then separated off by hot filtration. The polybutadiene-based hydroxyl-containing compounds thus produced are thoroughly esterified with unsaturated monocarboxylic acids until the hydroxyl number falls to an acceptably low number. For the pour point depressants of this invention, the hydroxyl (OH) number should be below 25 (mg KOH/g), preferably below 20, more preferably below 15, most preferably below 10. Esterification may be catalyzed in the same manner as in the one-step synthesis. Thus, the catalysts used may be, for example, organotin compounds or organotitanium compounds, preferably acidic organotin compounds.

The pour point depressants should also have a residual acid number below 20 and preferably below 10 mg KOH/g. Favorable products are obtained if the reaction mol ratio of fatty acid to epoxide is 1-2:1, preferably 1.3-1.8:1, or if the reaction mol ratio of fatty alcohol to epoxide is 0.8-1.2:1, preferably 0.9-0.1:1. The total number average molecular weight is in the range 1,500 to 10,000 and more especially in the range 2,500 to 7,000.

Particularly favorable pour point depressants are derived from saturated $C_{18}$ and $C_{22}$ carboxylic acids or from the corresponding fatty alcohols. Because of the relatively low viscosity of the polymers, it is possible to carry out the entire reaction (i.e. both the ring-opening step and the esterification step) in the melt. The melts thus obtained may be diluted with any apolar solvents either after cooling or while heated. This avoids the need to use solvents of the type which form a low-boiling azeotrope with water, which is imposed on prior art pour point depressants by the method of production.

Accordingly, the pour point depressants according to the invention are preferably formulated as solutions in high-boiling hydrocarbons. Another advantage of the products lies in the low viscosity of solutions such as these, in their low pour point and in the ease with which the products can be produced.

The pour point depressants according to the invention are used in quantities that are minimally effective to lower the pour point of the liquid to which they are added to a desired temperature. Typically, for crude oil containing paraffins, they are added in quantities of from 40 to 200 ppm, based on the oil.

EXAMPLES

Example 1

(Starting Ingredients)

The properties of the epoxidized polybutadienes used in Examples 2-14 of this invention are shown in Table 1:

| No. | Trademark (manufacturer) | % by weight of epoxide oxygen | Isomer distribution (%) | | | Molecular weight (wt. ave.) |
|---|---|---|---|---|---|---|
| | | | cis-1,4 | trans-1,4 | 1,2 (vinyl) | |
| 1. | "Lithene" PM epox. (Chemetall) | 3.2 | 15–25 | 30–40 | 50 | 1500 |
| 2. | "Poly-bd" R45HT epox. (Chemetall) | 6.15 | 60 | 20 | 20 | 2800 |
| 3. | "Poly-Huels" 110 epox. (CWH) | 8.6 | 75 | 24 | 1 | 1500 |
| 4. | "Nissin" BF 1000 Resin (Nippon Soda) | 7.2 | <15 | <15 | >85 | 1000 |
| 5. | "Lithene" PM epox. (Chemetall) | 3.4 | 15–25 | 30–40 | 50 | 1500 |
| 6. | "Lithene" PM epox. (Chemetall) | 4.7 | 15–25 | 30–40 | 50 | 1500 |
| 7. | "Polyol-Huels" 110 epox. (CWH) | 4.4 | 75 | 24 | 1 | 1500 |
| 8. | "Polyol-Huels" 110 epox. (CWH) | 3.1 | 75 | 24 | 1 | 1500 |

Example 2

(Invention Product—One Step Synthesis)

Reaction of Epoxidized Polybutadienes with Fatty Acids

The following components were mixed in a standard laboratory apparatus consisting of a three-necked spherical flask equipped with a stirrer, thermometer, water separator and reflux condenser:
250 g (0.5 "mol") of epox. polybutadiene No. 1 (see Example 1)
274 g of hardened rapeseed oil fatty acid (composition: 4% palmitic acid, 44% stearic acid, 2% oleic acid, 8% arachic acid, 42% behenic acid)
1 g of acidic organotin compound (catalyst) sold under the trademark "Swedcat 3" by Swedstab A. B., Sweden
100 ml of xylene (solvent)
The mixture was heated and the xylene distilled off until the temperature settled at 230°–240° C. 7 ml of condensate (water of reaction) were azeotropically separated off. The solvent was then removed by vacuum distillation. The total reaction time was 6 to 8 hours. The soft, wax-like product had an acid number of 7.9 mg KOH/g.

Example 3

(Invention Product—One Step Synthesis)

Procedure was as in Example 2, except using:
235 g of epoxidized polybutadiene No. 5
25 g of hardened rapeseed oil fatty acid
The acid number of the product was 6.5 mg KOH/g.

Example 4

(Invention Product—One Step Synthesis)

Procedure was as in Example 2, except using:
200 g of epoxidized polybutadiene No. 2
420 g of hardened rapeseed oil fatty acid
The acid number of the product was 8.7 mg KOH/g.

Example 5

(Invention Product—One Step Synthesis)

Procedure was as in Example 2, except using:
100 g of epoxidized polybutadiene No. 3
295 g of hardened rapeseed oil fatty acid
The acid number of the product was 7.2 mg KOH/g.

Example 6

(Invention Product—One Step Synthesis)

Procedure was as in Example 2, except using:
200 g of epoxidized polybutadiene No. 6
250 g of hardened stearic acid
The acid number of the product was 5.4 mg KOH/g.

Example 7

(Invention Product—One Step Synthesis)

Procedure was as in Example 2, except using:
100 g of epoxidized polybutadiene No. 4
261 g of behenic acid
The acid number of the product was 6.8 mg KOH/g.

Example 8

(Invention Product—One Step Synthesis)

Procedure was as in Example 2, except using:
200 g of epoxidized polybutadiene No. 7
213 g of tallow fatty acid
The acid number of the product was 7.6 mg KOH/g.

Example 9

(Intermediate Product for Example 11—Two Step Synthesis)

Reaction of the epoxidized polybutadienes with polyfunctional alcohols. The reaction was carried out in the laboratory apparatus described in Example 2 using the following components:
272.5 g of dimeric trimethylol propane (polyol)
4.5 g of potassium hydroxide (5 mol %, based on epoxide oxygen)
400 g of epoxidized polybutadiene No. 7
400 ml of diethylene glycol dimethyl ether (solvent).
To carry out the reaction, the dimeric trimethylol propane and the potassium hydroxide were introduced first into the reaction vessel. The epoxidized polybutadiene dissolved in diethylene glycol dimethyl ether was then added, after which the reaction mixture was kept at boiling temperature (165°-175° C.) for 6 hours. After neutralization with hydrochloric acid, the reaction mixture was filtered without cooling. The solvent was distilled off in vacuo at a maximum temperature of 170° C. The intermediate product had a hydroxyl number of 314; the epoxide oxygen content had fallen to below 0.1. See Example 11 for the esterification of this intermediate product.

Example 10

(Intermediate Product—Two Step Synthesis)

The procedure was as in Example 8 using:
50 g of epoxidized polybutadiene No. 8
23 g of dimeric trimethylol propane (polyol)
140 g of diethylene glycol dimethyl ether (solvent) and
0.5 g of potassium hydroxide
The hydroxyl number was 237.2. This example illustrates another preparation of an intermediate reaction product with a polyol. This intermediate product could easily be esterified as disclosed herein to yield a final product according to this invention.

Example 11

(Invention Product—Two Step Synthesis)

The reaction products of epoxidized polybutadienes with polyfunctional alcohols were esterified in the same way as in Example 2 using:
150 g of the reaction product of Example 9 (OH number 314)
272 g of hardened rapeseed oil fatty acid,
1 g of acidic organotin compound (catalyst)
50 ml of xylene (solvent)
The maximum temperature was 240° C. and the reaction time 7 hours. 15 ml of water of reaction were separated off, after which the solvent was distilled off in vacuo. The product had an acid number of 2.6 mg KOH/g.

Example 12

(Intermediate Product)

The following components were mixed with one another:
200 g of epox. polybutadiene No. 1
7 g of isobutyric acid, (short-chain acid)
168 g of hardened rapeseed oil fatty acid
1 g of acidic organotin compound (catalyst)
The mixture was stirred in a gentle stream of nitrogen for 8 h at 230° to 240° C. A vacuum of approximately 100 hPa was then applied at that temperature (for 30 minutes). The product obtained had an acid number of 7.6 mg KOH/g. The intermediate product illustrated by this example could easily be esterified as disclosed herein to yield a final product according to this invention.

Example 13

(Intermediate Product)

Reaction of epoxidized polybutadienes with fatty alcohols.
The following components were used:
300 g of epoxidized polybutadiene No. 8
176 g of $C_{18-22}$ fatty alcohol mixture
1.7 g of potassium hydroxide.
To carry out the reaction, the components were mixed, heated for 1 hour to 180° C. and kept at the temperature for 7 hours. After cooling to around 90° C., the reaction mixture was neutralized with acetic acid and then cooled to room temperature. This intermediate product had a hydroxyl number of 61; the epoxide oxygen content had fallen to below 0.1. The intermediate product illustrated by this example could easily be esterified as disclosed herein to yield a final product according to this invention.

Example 14

(Invention Product—Two Step Synthesis)

Reaction of epoxidized polybutadienes with fatty alcohols and further reaction with fatty acids.
The following components were used:
250 g of epoxidized polybutadiene No. 5
160 g of $C_{18-22}$ fatty alcohol mixture
1.6 g of potassium hydroxide
The reaction was carried out in the same way as in Example 13. The intermediate product obtained (hydroxyl number: 65) was directly esterified by adding the following components were then added to the neutralized mixture:
77 g of hardened rapeseed oil fatty acid
1.5 g of acidic organotic compound (catalyst)
100 ml of xylene (solvent)
Esterification was carried out in the same way as described in Example 2, only as a second step. The product obtained had an acid number of 2.8 mg KOH/g and a hydroxyl number of 19.

Example 15

(Evaluation)

Flow promotion test

To test the flow-promotion (pour point depressant) effect, solution of paraffin (setting point 46°-48° C.) in gasoline (boiling limit 145°-200° C.) were prepared. The paraffin content amounted to 15% by weight. 100 ppm of the inventive composition were added to the solutions, which were then cooled to solidification point, and the temperature at which the solidified mixture became liquid during remelting was determined, with the following results

| Example No. | Flow Point (°C.) |
|---|---|
| 2 | 1 |
| 3 | 1 |
| 4 | 2 |
| 5 | 2.5 |
| 6 | 6 |

-continued

| Example No. | Flow Point (°C.) |
|---|---|
| 7 | 4.5 |
| 8 | 5.5 |
| 11 | 1.5 |
| 14 | 1.0 |
| No pour point depressant | 15 |

Particular advantages

One particular advantage of the new products is the relatively low pour point of standard 50% solutions in toluene (about equal to 0° C.).

Another advantage is the possibility of using safer solvents, i.e. those having a higher flash point (for example "Solvesso" 200, flash point > 100° C.), for preparing the 50% solutions.

Solutions such as these may be prepared either:
(i) by carrying out the reaction itself in an appropriate solvent; or
(ii) by producing the products in the melt and dissolving the products in an appropriate solvent after the reaction.

What is claimed is:

1. A modified polyolefin having saturated and predominantly unbranched alkyl side chains and a hydroxyl number below 25 mg KOH/g, whose backbone is a polyolefin containing at least 50% by weight butadiene and which is modified by epoxidation of the polyolefin ethylenic double bonds to an epoxide oxygen content of from about 1% to 8% by weight, followed by ring opening of the epoxide groups by reaction with:
   (a) at least one first saturated $C_{12-24}$-carboxylic acid or a mixture of the first saturated $C_{12-24}$-carboxylic acid with from 0–30 mol percent of at least one $C_{4-12}$-monocarboxylic straight, brancid; oraromatic acid; or
   (b) at least one alcohol selected from
     (i) at least one saturated primary $C_{12-24}$-alcohol; or
     (ii) at least one $C_{2-12}$-polyol having 2 to 6 hydroxyl moieties;
followed by esterification of any remaining hydroxyl moieties with at least one second saturated $C_{12-24}$-carboxylic acid, to form said modified polyolefin.

2. The composition of claim 1 wherein said polyolefin backbone is a homopolymer of butadiene or a copolymer of butadiene with styrene and/or acrylonitrile.

3. The composition of claim 1 wherein said butadiene is 1,4-polybutadiene containing more than 20% of its ethylenic bonds in a cis configuration.

4. The composition of claim 1 wherein said butadiene is 1,4-polybutadiene containing more than 70% of its ethylenic bonds in a cis configuration.

5. The composition of claim 1 wherein said butadiene is 1,4-polybutadiene containing more than 20% of its ethylenic bonds in a trans configuration.

6. The composition of claim 1 wherein said butadiene is 1,4-polybutadiene containing more than 50% of its ethylenic bonds in a trans configuration.

7. The composition of claim 1 wherein said polyolefin is 1,2-polybutadiene containing from 20 to 98% lateral ethylenic bonds.

8. The composition of claim 1 wherein, after epoxidation but before ring opening, said polyolefin has a number average molecular weight of about 500 to 10,000.

9. The composition of claim 1 wherein, after epoxidation but before ring opening, said polyolefin has a number average molecular weight of about 1,000 to 2,000.

10. The composition of claim 8 wherein said polyolefin has an epoxide oxygen content of about 2 to 6% by weight.

11. The composition of claim 8 wherein said polyolefin has an epoxide oxygen content of about 3 to 5% by weight.

12. The composition of claim 1 wherein said first and said second saturated $C_{12-24}$ carboxylic acid are each at least one fatty acid having an iodine number below 50.

13. The composition of claim 12 wherein said iodine number is below 10.

14. The composition of claim 13 wherein each said at least one fatty acid is a mixture of $C_{16-22}$ fatty acids.

15. The composition of claim 1 wherein said first and said second at least one saturated $C_{12-24}$ carboxylic acid are each a hydrogenated fatty acid mixture derived from vegetable oil, land-animal oil, and/or marine-animal oil.

16. The composition of claim 1 wherein said first and said second at least one saturated $C_{12-24}$ carboxylic acid are each a hydrogenated tallow fatty acid, hydrogenated rapeseed oil fatty acid, or any mixture thereof.

17. The composition of claim 1 wherein said ring-opening is effected by reaction with (b) and wherein said alkyl side chains are derived from at least one $C_{18-22}$ alcohol.

18. The composition of claim 1 wherein said ring-opening is effected by reaction with (b) and wherein said alkyl side chains are derived from stearyl alcohol, behenyl alcohol, or their mixture.

19. The composition of claim 16 wherein said ring-opening is effected by reaction with (b) and wherein said alkyl side chains are derived from at least one $C_{18-22}$ alcohol.

20. The composition of claim 1 wherein said ring-opening is effected by reaction with (b)(ii) and wherein said $C_{2-12}$ polyol contains up to 3 ether oxygen atoms as said hydroxyl moieties.

21. The composition of claim 16 wherein said ring-opening is effected by reaction with (b)(ii) and wherein said $C_{2-12}$ polyol contains up to 3 ether oxygen atoms as said hydroxyl moieties.

22. The composition of claim 1 wherein said ring-opening is effected by reaction with (b)(ii) and wherein said $C_{2-12}$ polyol is: ethylene glycol; propylene glycol; neopentyl glycol; diethylene glycol; glycerol; trimethylol ethane; trimethylol propane; pentaerythritol; ditrimethylol ethane, ditrimethylol propane, or any mixture thereof.

23. The composition of claim 16 wherein said ring-opening is effected by reaction with (b)(ii) and wherein said $C_{2-12}$ polyol is: ethylene glycol; propylene glycol; neopentyl glycol; diethylene glycol; glycerol; trimethylol ethane; trimethylol propane; pentaerythritol; ditrimethylol ethane, ditrimethylol propane, or any mixture thereof.

24. The composition of claim 1 wherein said polyolefin has a total number average molecular weight of about 1,500 to 10,000.

25. The composition of claim 1 wherein said polyolefin has a total number average molecular weight of about 2,500 to 7,000.

26. A pour point depressant composition comprising a carrier liquid and a pour point depressant consisting essentially of a pour point depressant effective amount of a modified polyolefin having saturated and predominantly unbranched alkyl side chains and a hydroxyl number below 25 mg KOH/g, whose backbone is a polyolefin containing at least 50% by weight butadiene which is modified by epoxidation of the polyolefin ethylenic double bonds to a epoxide oxygen content of from about 1% to 8% by weight, followed by ring-opening of the epoxide groups by reaction with:
(a) at least one first saturated $C_{12-24}$-carboxylic acid, or a mixture of the $C_{12-24}$-carboxylic acid with from 0–30 mol percent of a least one $C_{4-12}$-monocarboxylic straight, branched, or aromatic acid; or
(b) at least one alcohol selected from
  (i) at least one saturated primary $C_{12-24}$-alcohol; or
  (ii) at least one $C_{2-12}$-polyol having 2 to 6 hydroxyl moieties;

followed by esterification of any remaining hydroxyl moieties with at least one second saturated $C_{12-24}$-carboxylic acid.

27. The composition of claim 26 wherein said carrier liquid is a high boiling, apolar, hydrocarbon solvent for said pour point depressant.

* * * * *